United States Patent [19]

Rasilewicz

[11] Patent Number: 5,024,849

[45] Date of Patent: Jun. 18, 1991

[54] LIQUID COFFEE WHITENER

[75] Inventor: Casimir E. Rasilewicz, Woodland Hills, Calif.

[73] Assignee: Nestec S.A., Vevey, Switzerland

[21] Appl. No.: 517,130

[22] Filed: May 1, 1990

[51] Int. Cl.$^5$ ............................................. A23D 7/00
[52] U.S. Cl. .................................... 426/656; 426/601; 426/602; 426/613
[58] Field of Search ............... 426/613, 601, 602, 656, 426/34, 42

[56] References Cited

U.S. PATENT DOCUMENTS

| | | | |
|---|---|---|---|
| 3,935,325 | 1/1976 | Gilmore et al. | 426/613 |
| 4,025,659 | 5/1977 | Cho et al. | 426/658 |
| 4,046,926 | 9/1977 | Gardiner | 426/613 |
| 4,092,438 | 5/1978 | Tonner | 426/613 |
| 4,242,364 | 12/1980 | Buddemeyer et al. | 426/613 |
| 4,511,590 | 4/1985 | Caldwell | 426/613 |
| 4,600,588 | 7/1986 | Ernster | 426/580 |
| 4,627,983 | 12/1986 | Scharf et al. | 426/654 |
| 4,762,721 | 8/1988 | Holscher et al. | 426/613 |
| 4,857,341 | 8/1989 | Tran et al. | 426/613 |

*Primary Examiner*—Donald E. Czaja
*Assistant Examiner*—D. Workman

[57] ABSTRACT

A liquid coffee whitener comprising an aqueous emulsion system which contains as its essential ingredients fat or oil, water, carbohydrate, and an amount of a protein hydrolysate effective to provide a stable emulsion and buffer the emulsion, with the emulsion having a pH of above 7.0. The use of protein hydrolysate provides an effective alternative, both functionally and organoleptically, the the use of sodium caseinate and buffering salts used in coventional liquid coffee whiteners.

10 Claims, No Drawings

LIQUID COFFEE WHITENER

BACKGROUND OF THE INVENTION

This invention relates to an aqueous fat emulsion product suitable for use as a coffee whitener and to the method of producing the liquid coffee whitener.

Liquid non-dairy coffee whiteners are used widely by consumers in homes and in restaurants to flavor and whiten coffee. Such liquid non-dairy whiteners, which comprise an aqueous emulsion of vegetable fat or oil, closely simulate fluid dairy products, and are formulated to provide a product having good whitening ability when added to coffee, a bland flavor, no off-odors, and good stability. Liquid non-dairy whiteners contain as essential ingredients vegetable fat or oil, carbohydrate, protein, emulsifiers, stabilizers, buffering salts and water, with a typical product having the following formulation

| vegetable fat | 3.0–18.0% by wt |
| --- | --- |
| carbohydrate | 2.5–6.0 |
| protein | 1.0–3.0 |
| emulsifier | 0.3–0.5 |
| stabilizer | 0.1–0.2 |
| buffering salt | 0.1–0.5 |
| color/flavor | as needed |
| water | q.s. to 100% |

In such coffee whitener formulations the vegetable fat or oil, which has a particle size of about 1–3 microns in diameter, provides whitening power, body and viscosity, with the whitening effect in coffee being produced primarily as a result of light reflected from the surface of finely emulsified fat globules. Carbohydrates, usually corn syrup solids and sucrose, function mainly as a bodying agent and provide some sweetness effect in the liquid whitener. Emulsifiers, such as mono-and diglycerides, diacetyl tartaric acid esters of mono-and diglycerides, propylene glycol monostearate, and the like, are incorporated to maintain the fat globules in dispersion. Stabilizers, typically hydrophilic colloids, improve the colloidal solubility of the protein used in the formulation and aid in controlling body and viscosity of the product.

Protein has been considered to be an essential component in aqueous fat emulsion whiteners. The protein, which almost always is sodium caseinate, encapsulates the fat or oil globules and binds water, thus stabilizing the emulsion and preventing coalescence and separation of the fat globules. However sodium caseinate is subject to periodic availability shortages and its use in food products adds substantially to the cost of such products. Attempts to replace sodium caseinate with other water dispersible proteins, such as soy protein, have been less than satisfactory due to poor emulsion stability, off-flavors, fat separation, poor whitening ability and other problems. In addition, in whitener formulations containing caseinate or other water dispersible proteins, it is common to include in the product, stabilizing salts (such as sodium citrate, tetrasodium pyrophosphate, etc.) to improve the colloidal dispersibility of the protein, and buffering salts (such as disodium or dipotassium phosphate, sodium aluminum phosphate, etc.) to increase the pH of the coffee above the isoelectric point of the protein. The inclusion of these materials, of course, increases the cost of the product. Moreover, the inclusion of such chemical compounds in food products, including coffee whiteners, is objectionable to some consumers.

SUMMARY OF THE INVENTION

The present invention provides a liquid coffee whitener comprising an aqueous fat emulsion system which contains as its essential ingredients fat or oil, water, carbohydrate, emulsifier, and an amount of a protein hydrolysate effective to stabilize the emulsion against fat separation and to buffer the emulsion. The liquid whitener of this invention has a high degree of stability, remaining in a physically uniform state upon refrigerated storage for extended periods of time, and exhibiting no signs of fat separation or feathering when added to coffee. The product has good whitening ability and a flavor, mouth-feel, color and aroma substantially equal to that of conventional liquid non-dairy coffee whiteners.

Thus, it has been found that a protein hydrolysate, preferably hydrolyzed soy or whey protein concentrate, can be utilized in liquid coffee whitener formulations as a replacement for both the sodium caseinate or other protein and the buffering salt previously used in such products. The protein hydrolysate can be obtained from any number of edible protein sources, including vegetable proteins and proteins of milk origin, by subjecting the proteinaceous material to an enzymatic hydrolysis by means of a proteolytic enzyme or mixture of proteolytic enzymes. The protein hydrolysate may be included in the whitener formulation either in liquid form or as a dried powder.

In accordance with a preferred embodiment of this invention, the conventional emulsifiers used in liquid coffee whiteners, such as mono-and diglycerides, are replaced with an emulsifier system of a blend of lecithin and enzyme modified egg yolk obtained by treating egg yolk sequentially with a protease and a lipase enzyme. The use of such an emulsifier system which contains only naturally occurring ingredient sources, namely lecithin, egg yolk and enzymes, in conjunction with the use of the enzyme hydrolyzed protein discussed above, in the formulation of the liquid coffee whitener of this invention enables the whitener to be formulated free of chemical compounds such as conventional emulsifiers, stabilizing salts and buffering salts considered objectionable by some consumers.

DETAILED DESCRIPTION OF THE INVENTION

The present invention provides an effective alternative, both functionally and organoleptically, to the use of sodium caseinate or other proteins and buffering salts as well as conventional emulsifiers used in formulated liquid coffee creamers. As noted hereinabove, the liquid coffee whitener of this invention contains as its essential ingredients fat or oil, carbohydrate, protein hydrolysate, emulsifier and water.

The vegetable fat constituent may comprise between about 3% to 18% by weight of the liquid whitener formulation, with amounts of between about 5% to 10% by weight being preferred. Any of the vegetable fats or oils having a bland or neutral flavor used in conventional liquid coffee creamers may be used in this invention. Fats which may be used include partially or wholly hydrogenated vegetable fats and oils such as, for example, coconut oil, soybean oil, cottonseed oil, palm oil, palm kernel oil, safflower oil, corn oil, sunflower oil, and the like, including blends of such oils. Generally it is preferred to use vegetable fats having a melting point in the range of about 25° C. to 46° C. (77° F. to 115° F.), preferably between about 38° C. to 43° C. (100° F. to 110° F.). One preferred vegetable fat is a blend of partially hydrogenated cottonseed and soy bean oils.

In preparing the liquid whitener of the present invention, the fat portion is combined with water, carbohydrate, emulsifier and an effective amount of protein hydrolysate i.e. between about 2% to 12% by weight of the liquid coffee whitener. An effective amount of protein hydrolysate means an amount which provides sufficient functionality to impart stability to the liquid whitener against fat coalescence and separation and provide the whitener with a pH of above 7.0. The hydrolysate can be derived from any number of edible protein sources of vegetable or milk origin, including, for example, whey protein, egg albumen, soy protein, wheat gluten, rice protein, pea protein and the like. The protein may be used in flour, isolate or concentrate form. Whey protein concentrate and soy protein concentrate are preferred protein sources.

The protein material is subjected to enzymatic hydrolysis by any of the conventional procedures using mixed or purified proteolytic enzymes active at a basic or neutral pH. Typical of the enzymes which can be used alone or in combination to effect the hydrolysis are trypsin and various bacterial (Amano N/*Bacillus subtilis* derived, Alcalase/*Bacillus licheniformis* derived) and fungal (Amano 2A, Prozyme 6/*Aspergillus oryzae* derived) proteases. Typically the protein material is dispersed in distilled water at a temperature of from about 25° C. to 60° C. with agitation to provide a protein dispersion or solution having a concentration of about 10% to 25% (w/v). The proteolytic enzyme is added in an amount of from about 0.1% to 2% based on the weight of the protein. The hydrolysis may be carried out from 30 minutes to 7 hours or more depending on the particular reaction conditions, protein material and enzymes used. One skilled in the art can by simple preparatory work or knows by experience what conditions can be used and what process conditions are optimal. However, it is known that the hydrolysate will have a pronounced off-flavor or bitter flavor upon extensive hydrolysis of the protein. It is preferred that the hydrolysis be terminated, such as by heating the hydrolysis medium to a temperature sufficient to inactivate the enzyme, at a time when the pH is above 7.0 and before a pronounced off-flavor or bitter flavor is developed. The hydrolysate can be used in the whitener of this invention as is or may be separated and dried.

A carbohydrate is included in the liquid whitener formulations to provide desired body and flavor characteristics. Any of the carbohydrates used in conventional liquid whiteners, such as corn syrup solids, sucrose, lactose, and the like, including combinations thereof, may be used, with the carbohydrate comprising about 2.5% to 15%, preferably between 4% to 10% by weight of the whitener formulation.

An emulsifier is an essential ingredient of the liquid whitener. In accordance with one embodiment of the invention, any of the food approved emulsifiers used in conventional liquid coffee whiteners may be used, such as, for example, mono-and diglycerides of fatty acids, propylene glycol monostearate, sorbitan esters of fatty acids, diacetyl tartaric ester of mono-and diglycerides, and combinations of such emulsifiers, in an amount of from about 0.1% to 1.0%, preferably between 0.3% to 0.5% by weight of the whitener formulation.

In accordance with a preferred embodiment of the invention, a blend of approximately equal amounts of lecithin and enzyme modified egg yolk is used as the emulsifier in the whitener formulation. The enzyme modified egg yolk may be obtained from suitable sources or may be produced by contacting egg yolk first with a protease enzyme followed by the addition of lipase under conditions sufficient to hydrolyze the protein and lipid constituents of the egg yolk. The combination of lecithin and enzyme modified egg yolk is included in the whitener formulation in an amount of between 0.1% to 1.0%, preferably between 0.4% to 0.8%, by weight of the formulation as an effective replacement for conventional emulsifiers.

Other ingredients typically included in liquid coffee whiteners may also be incorporated in the composition of this invention, such as flavoring agents and colorants.

The amounts of fat, carbohydrate, emulsifier, hydrolyzed protein and optionally included ingredients as well as the amount of water employed in preparing the liquid whitener composition of this invention can be varied over the relatively wide limits. The formulation should be controlled to provide a liquid whitener having a solids contents of about 10% to 30%, preferably about 20%, by weight. Sufficient protein hydrolysate is included in the whitener formulation so that upon addition to coffee the creamed coffee has a pH of above about 6.0.

In preparing the preferred liquid coffee whitener of this invention, the protein hydrolysate and enzyme modified egg yolk portion of the emulsifier are added with agitation to hot water. The vegetable fat, which has been heated to a temperature above its melting point, preferably above about 54° C. (130° F.), is combined with the lecithin portion of the emulsifier, and the resulting mix is added, with agitation to the aqueous phase. The remaining dry ingredients are then added with agitation. The resulting mixture may then be pasteurized, if desired, and is homogenized in one or two stages at about 1500 psi to 6000 psi (105.4 to 421.8 Kg/sq. cm) total pressure to provide an emulsion in which the fat globules average about 1–3 microns in diameter. The resulting emulsion is then cooled, packaged in suitable containers and stored under refrigerated conditions.

Although the protein hydrolysate functions in the liquid coffee whitener as a replacement for both the conventional protein and buffer components of the product, it may, if desired, be used only as a replacement for the buffer. That is, a protein, such as sodium caseinate, used in conventional liquid coffee whiteners may be included together with the fat, carbohydrate, protein hydrolysate and emulsifier, typically at levels of about 1% to 3% by weight of the composition.

The following examples are provided to further illustrate, not to limit, the invention. All parts and percentages are by weight unless otherwise indicated.

EXAMPLE 1

A whey protein hydrolysate is prepared by dissolving 200 gm. of whey protein concentrate (35% protein) in 1 liter of distilled water. The solution is heated to 55° C. and the pH adjusted to 7.30 with 1 N potassium hydroxide. Then, trypsin is added in an amount of 1% based on protein content, with agitation, and the pH maintained at 7.3. After incubation at 55° C. for 2 hours, the enzyme is inactivated by heating to 90° C. The hydrolysate is then freeze dried.

EXAMPLE 2

A stable liquid coffee whitener having good whitening properties is prepared from the following ingredients:

| Ingredient | Weight % |
| --- | --- |
| Vegetable fat (blend of partially hydrogenated cottonseed and soybean oils) | 6.8 |
| Carbohydrate (corn syrup solids) | 4.0 |
| Whey protein hydrolysate | 8.8 |
| Emulsifier | |
| Enzyme modified egg yolk, | 0.2 |
| lecithin | 0.2 |
| Water, sodium softened | 80.0 |
| | 100.0 |

To prepare the liquid whitener, a fat phase was prepared by blending and heating the vegetable fat and the lecithin at 80° C. An aqueous phase was then prepared by adding to hot water (90°–95° C.) the whey protein hydrolysate prepared in accordance with the procedure of Example 1 and enzyme modified egg yolk. The two phases were then admixed in a Waring Blender at high speed for 5 minutes, after which the corn syrup solids was added and mixed for 2 minutes. The mixture was then homogenized at 2000 psi (140.6 Kg/sq. cm.), and the resulting emulsion cooled to about 10° C. in an ice bath and stored under refrigeration.

The resulting product, which has a pH of 7.7, was then evaluated for stability, whitening ability in coffee, taste and flavor. In conducting these tests, whitened coffee was prepared by adding the liquid creamer to a 1.4% solution of freeze dried coffee in distilled water at 71.7° C.–82.2° C. (160° F.–180° F.) in an amount of 2.3% by weight of the coffee. The pH of the coffee was measured both before and after addition of the whitener. After 2 minutes the whitened coffee was observed for feathering. The whitening effect of the liquid whitener in coffee was determined colorimetrically using a calibrated Gardner/Neotec Colorgrad System 2000 Colorimeter to measure light reflected from the whitened coffee sample. The "L" scale of this instrument is a measure of lightness-darkness, with high "L" scale reading being indicative of greater whitening power. Differences of 1.0 L value readings are visually significant. Taste and flavor of the liquid whitener were evaluated both "as-is" and in coffee. Emulsion stability of the whitener was evaluated through 60 days refrigerated storage. To provide a basis for comparison, the characteristics and performance of the liquid whitener of this example were compared with those of a commercially available liquid coffee whitener formulation, which had an "L" scale reading of about 49.0. The liquid whitener of this example had the following characteristics and properties.

TABLE 1

| Test | Result |
| --- | --- |
| pH | |
| liquid coffee whitener | 7.77 |
| unwhitened coffee | 5.48 |
| whitened coffee | 6.64 |
| Whitening in coffee | |
| "L" scale reading | 50.78 |
| Stability | |
| Refrigerated storage | no separation |

TABLE 1-continued

| Test | Result |
| --- | --- |
| in coffee | good |
| Taste and flavor | good |

The result of these tests show that the composition of this invention has the stability, whitening, buffering, taste and flavor characteristics necessary for a liquid coffee whitener.

EXAMPLE 3

Soy protein hydrolysate was produced according to the procedure of Example 1 with the exception that soy protein concentrate, rather than whey protein concentrate, was used. A liquid coffee whitener containing the soy protein hydrolysate was made from the following ingredients:

| Ingredient | Weight % |
| --- | --- |
| Vegetable fat (blend of partially hydrogenated cottonseed and soybean oils) | 6.8 |
| Carbohydrate (corn syrup solids) | 8.55 |
| Soy protein hydrolysate | 4.25 |
| Emulsifier | |
| Enzyme modified egg yolk | 0.2 |
| lecithin | 0.2 |
| Water, sodium softened | 80.0 |
| | 100.0 |

The product was prepared using the same procedure described in Example 2 and was subjected to the same tests described in that Example. The following results were obtained.

TABLE 2

| Test | Result |
| --- | --- |
| pH | |
| liquid coffee whitener | 7.56 |
| unwhitened coffee | 5.44 |
| whitened coffee | 6.90 |
| Whitening in coffee | |
| L scale reading | 50.82 |
| Stability | |
| refrigerated storage (50 days) | no separation |
| in coffee | acceptable |
| Taste and flavor | acceptable |

This product had the properties and characteristics necessary for a liquid coffee whitener.

EXAMPLE 4

A liquid coffee whitener made in accordance with the present invention but incorporating conventional emulsifiers was prepared from the following ingredients:

| Ingredient | Weight % |
| --- | --- |
| Vegetable fat (blend of partially hydrogenated cottonseed and soybean oils) | 6.8 |
| Carbohydrate (corn syrup solids) | 8.6 |
| Soy protein hydrolysate | 4.2 |
| Emulsifier (blend of sodium stearoyl lactylate and polysorbate 60) | 0.4 |
| Water, sodium softened | 80.0 |

| Ingredient | Weight % |
|---|---|
| | 100.0 |

In preparing the whitener, soy protein hydrolysate produced in accordance with the procedure of Example 1, was dissolved in the water, and a blend of melted vegetable fat (80° C.) and the two emulsifiers was added to the water phase with agitation. The corn syrup solids was then added to the blend and the homogenized at 6000 psi (421.8 Kg./sq. cm.), cooled in an ice bath and stored under refrigeration. The resulting product was tested in accordance with the procedures described in Example 2, with the following results.

TABLE 3

| Test | Result |
|---|---|
| pH | |
| liquid coffee whitener | 7.45 |
| unwhitened coffee | 5.46 |
| whitened coffee | 6.58 |
| Whitening in coffee | |
| L Scale reading | 53.32 |
| Stability | |
| refrigerated storage (30 days) | no separation |
| in coffee | acceptable |
| Taste and flavor | acceptable |

This product had the properties and characteristics necessary for a liquid coffee whitener.

What is claimed is:

1. A liquid coffee whitener which consists essentially of an aqueous fat emulsion system containing 3% to 18% by weight edible fat, 2.5% to 15% by weight carbohydrate, from 0.1% to 1% by weight of lipoidal emulsifier, and an amount of protein hydrolysate effective to stabilize the emulsion against fat separation and buffer the emulsion, with the whitener having a pH above 7.0.

2. The coffee whitener defined in claim 1 in which the whitener contains about 2% to 12% by weight protein hydrolysate.

3. The coffee whitener defined in claim 2 in which the protein hydrolysate is derived by contacting an edible protein source of vegetable or milk origin with proteolytic enzyme under conditions which hydrolyze the protein.

4. The coffee whitener defined in claim 3 in which the protein hydrolysate is derived by contacting an aqueous dispersion of the edible protein source having a protein concentration of between about 10% to 25% (w/v) and a temperature of about 25° to 60° C. with from 0.1% to 2% of said enzyme, based on the weight of the protein, for a period of time ranging from 30 minutes to 7 hours.

5. The coffee whitener defined in claim 3 in which protein hydrolysate is derived by contacting soy protein concentrate or whey protein concentrate with trypsin.

6. The coffee whitener defined in claim 1 in which the emulsifier is a blend of approximately equal amounts of lecithin and enzyme modified egg yolk.

7. A method for producing a liquid coffee whitener suitable for addition to coffee having an acidic pH which comprises forming an aqueous fat emulsion system which consists essentially of water, about 3% to 18% by weight fat or oil, about 0.1% to 1% lipoidal emulsifier, about 2.5% to 15% by weight carbohydrate, and an amount of protein hydrolysate effective to stabilize the emulsion against fat separation, buffer the emulsion and provide the emulsion with a pH of above 7.0, and pasteurizing and homogenizing the aqueous emulsion.

8. The method defined in claim 7 in which the protein hydrolysate is derived by treating an edible protein source of vegetable or dairy origin with a proteolytic enzyme, and is present in the aqueous emulsion in an amount of between 2% to 12% by weight of the emulsion.

9. The method defined in claim 7, in which the emulsifier comprises approximately equal amounts of lecithin and enzyme modified egg yolk.

10. In the method of preparing a liquid coffee whitener by forming an aqueous fat emulsion containing fat, protein, carbohydrate, emulsifier and buffering agent, the improvement which comprises incorporating in the aqueous fat emulsion as the buffering agent an amount of protein hydrolysate sufficient to provide the emulsion with a pH of above 7.0.

* * * * *